Oct. 12, 1926.
J. E. BODA
1,603,019
IMPLEMENT HITCH
Filed June 11, 1923
5 Sheets-Sheet 1
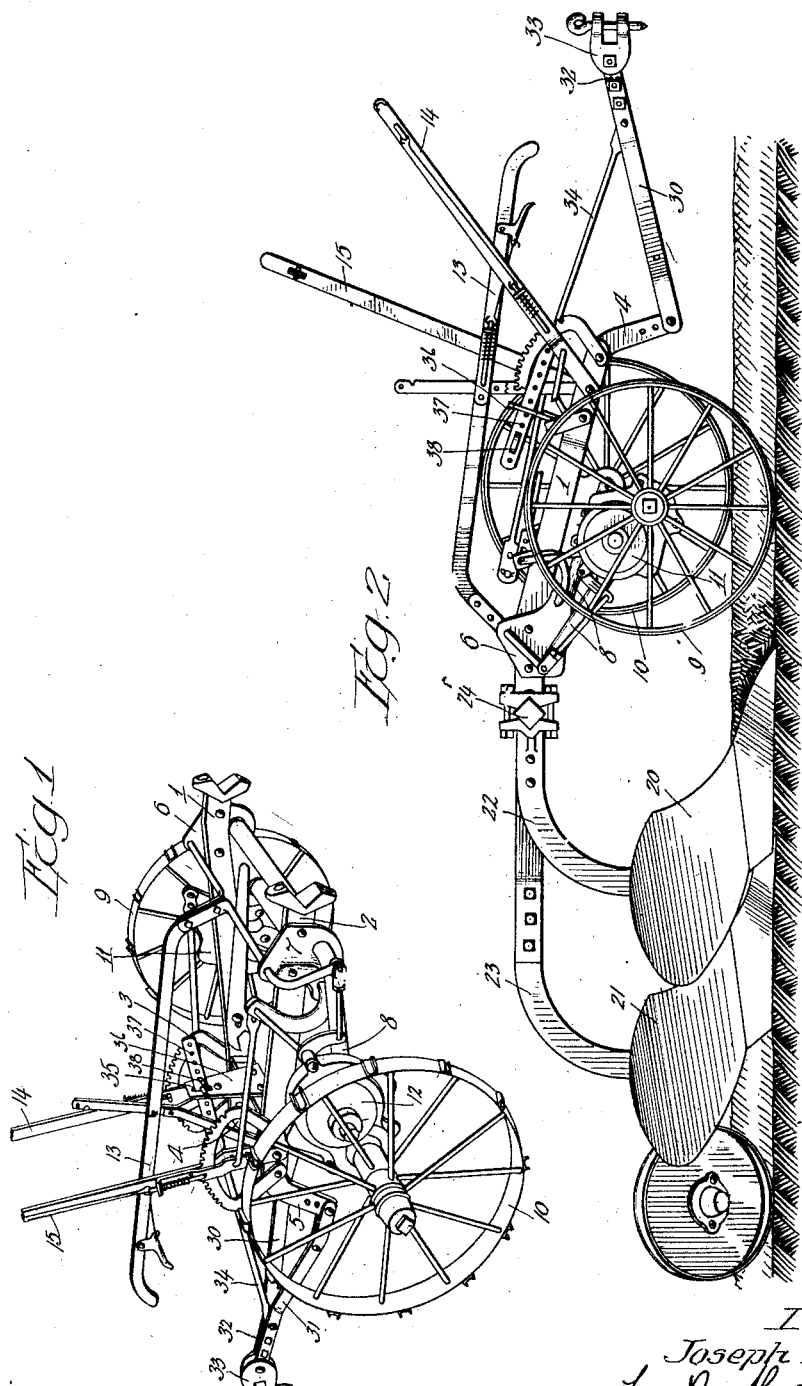
Inventor:
Joseph E. Boda
by J.C. Shorts
Atty Oct. 12, 1926.

J. E. BODA 1,603,019

IMPLEMENT HITCH

Filed June 11, 1923   5 Sheets-Sheet 2

Inventor:
Joseph E. Boda
by S.C. Shonts  Atty.

Oct. 12, 1926.
J. E. BODA
1,603,019
IMPLEMENT HITCH
Filed June 11, 1923
5 Sheets-Sheet 5
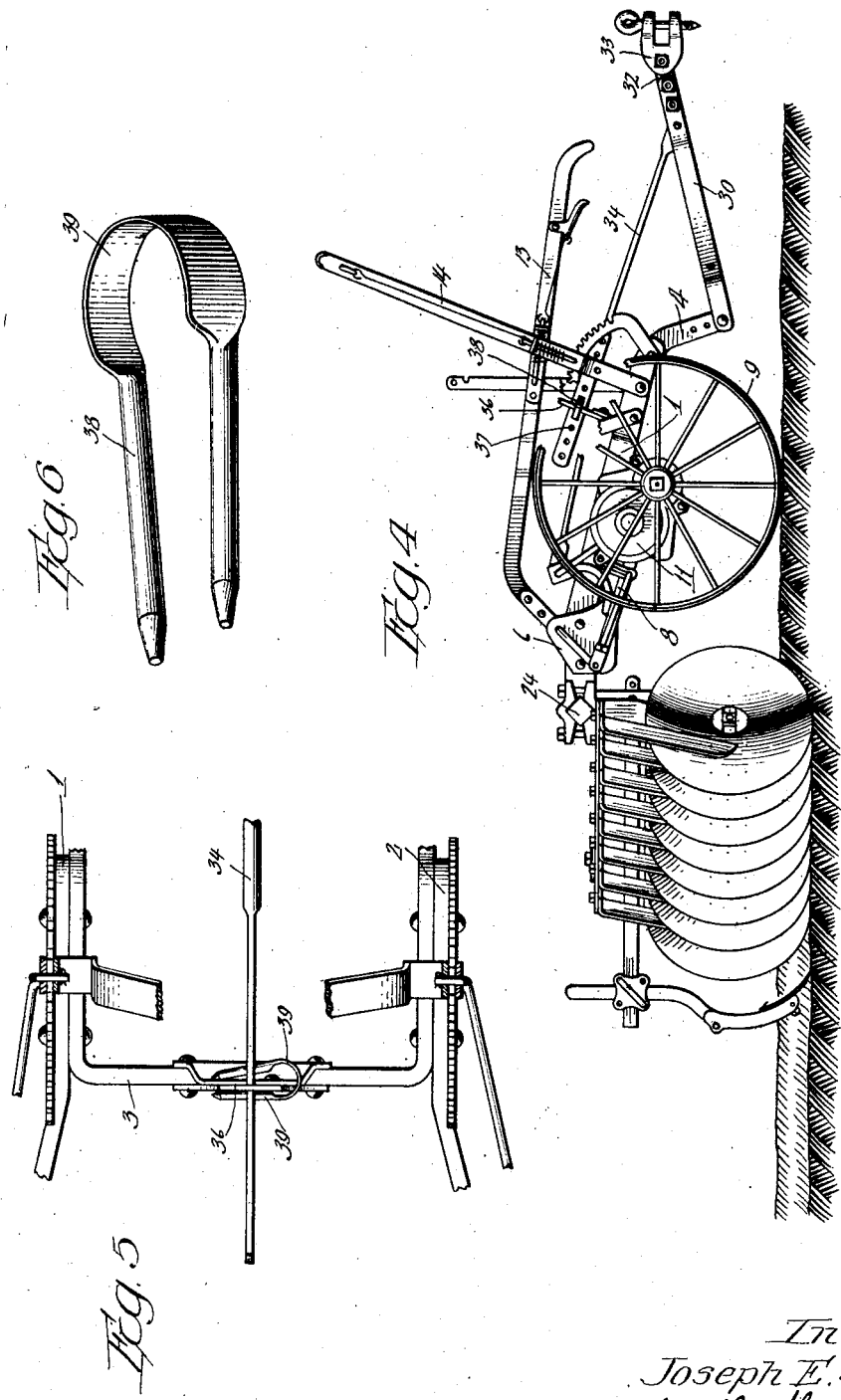
Inventor:
Joseph E. Boda

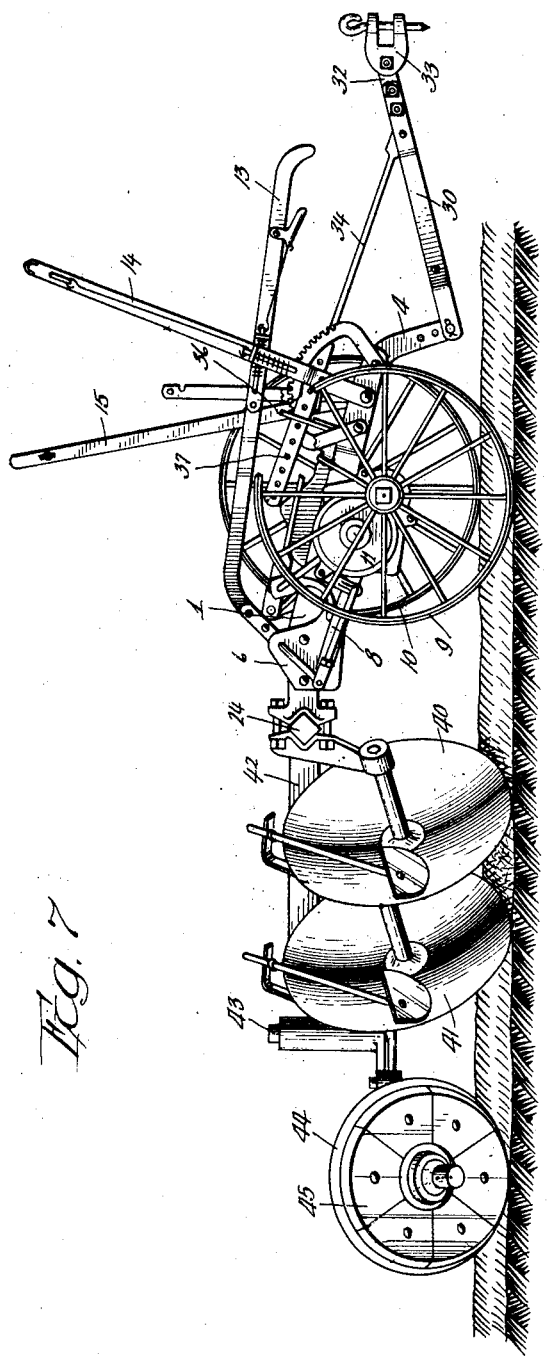

Oct. 12, 1926.

J. E. BODA 1,603,019

IMPLEMENT HITCH

Filed June 11, 1923    5 Sheets-Sheet 5

Inventor:
Joseph E. Boda
by L.C. Shonts Atty

Patented Oct. 12, 1926.

1,603,019

UNITED STATES PATENT OFFICE.

JOSEPH E. BODA, OF MOLINE, ILLINOIS, ASSIGNOR, BY MESNE ASSIGNMENTS, TO MOLINE IMPLEMENT COMPANY, A CORPORATION OF ILLINOIS.

IMPLEMENT HITCH.

Application filed June 11, 1923. Serial No. 644,579.

The invention relates to an implement hitch.

It relates particularly to a hitch that can be used with a wide variety of implements, that is, a hitch which, without changes in construction, can be used where different functions are required of it.

The hitch of an implement has much to do with the failure or success of the implement itself. For example, the hitch for a moldboard plow must be properly made and located in relation to the line of draft to keep the plow in proper position for plowing without requiring too much power to pull it. It is necessary that the hitch have a certain amount of flexibility while the plow is operating so that it will be free to adjust itself properly to the line of draft to accommodate the plow to the variations in the ground. Most tractor plows are provided with powerlift mechanisms which, when operated, tend to first raise the front end of the plow. In such cases it is desirable that the hitch become rigid as the plow is raised so as to brace the front end of the plow to prevent it from tilting upwardly. On the other hand, in the case of disc plows it is sometimes desirable to have the hitch flexible under all conditions, whether the plow be raised or lowered. Again, in the case of other implements as, for example, a disc harrow, it is desirable to have the hitch rigid under all conditions, both when operating and when the disc harrow is in transport position.

It has heretofore been the practice to use a separate hitch for each of these various implements, requiring a duplication of many of the parts for each implement. The present invention is directed toward a hitch that can be used as a flexible hitch, a semi-flexible hitch, or a rigid hitch, without requiring that any changes be made in the construction.

The general object of the invention is to provide an improved implement hitch.

A more specific object is to provide an implement hitch which may be used as a fully flexible hitch, a semi-flexible hitch, or as a rigid hitch by a simple adjustment and without changing the hitch construction.

Other objects and advantages of the invention will hereinafter appear.

An embodiment of the invention is shown in the drawings, in which—

Figure 1 is a perspective of the universal carriage to which the hitch is connected.

Figure 2 is a side elevation of the hitch applied to a mold board plow which is illustrated in lowered position.

Figure 4 is a side elevation of the hitch as used with a disc harrow, the disc harrow being illustrated in its lowered or operating position and some of the parts being cut away to illustrate the hitch more clearly.

Figure 5 is a plan view of a part of the hitch illustrating the adjustable stop.

Figure 6 is a perspective of the adjustable stop member.

Figure 7 is a side elevation of the hitch in the position it occupies when used with a disc plow in lowered position.

Figure 3:
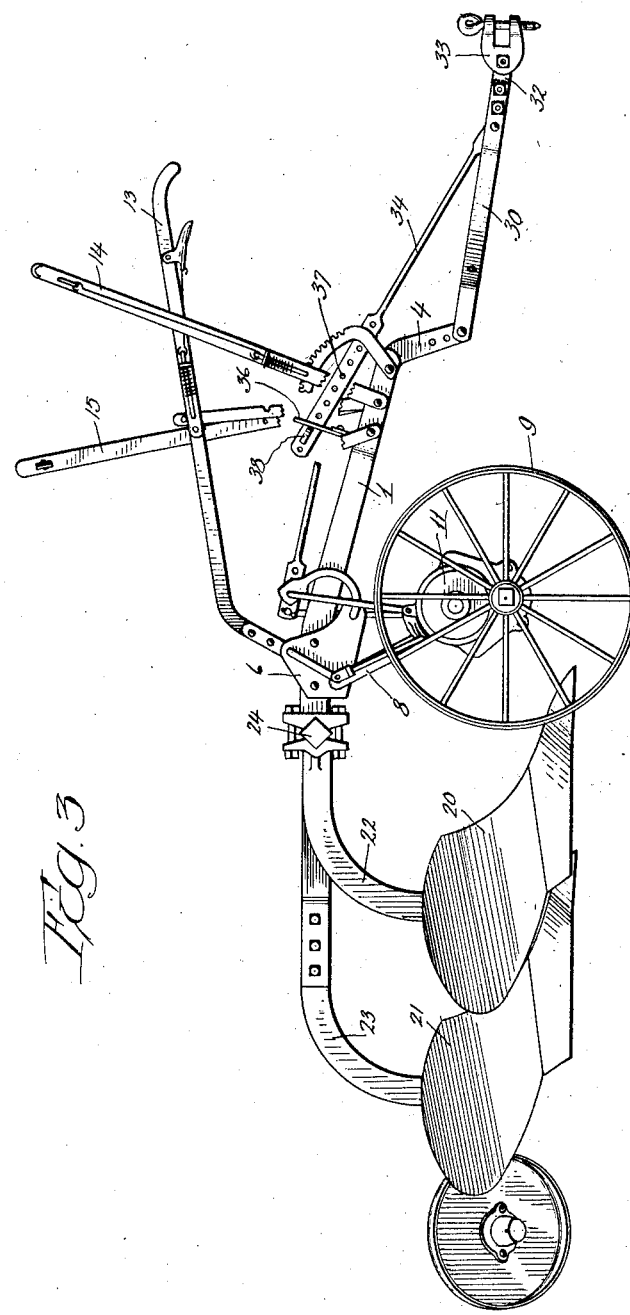
Figure 3 is a side elevation similar to that of Figure 2 with the plow in raised position and with some of the parts in the neighborhood of the hitch cut away so as to illustrate the hitch more clearly.

In order to understand the operation of the hitch, it will be necessary to briefly explain the construction and operation of the implement with which it is illustrated.

The hitch is shown connected to a universal agricultural implement or carriage which may be used for a wide variety of purposes such as for moldboard plowing, disc plowing, disc harrowing, listing, and for other farming operations. It will be understood that the hitch can be used with separate implements, each for a different purpose. It could be so used either by changing it from one implement to another or by having a duplicate hitch for each implement. In the latter case there would be a duplication of parts but the construction of the hitches would be substantially the same in each case which, would simplify manufacture and reduce expense in the matter of carrying inventories and repair stocks.

The universal carriage comprises draft bars 1 and 2 connected together at their forward ends by a cross brace 3 which has downwardly projecting ends 4 and 5 to which the hitch bars are pivoted. Pivoted in bearing plates 6 and 7 on the draft bars are crank axles 8 carrying grounds wheels 9 and 10. One of the crank axles is shown in Figure 1, the opposite axle being similar and appearing in Figure 2.

The two crank axles are moved relative to the draft bars independently of each other by powerlift mechanisms 11 and 12 which are tripped into operation simultaneously by a control lever 13 extending forwardly where it may be manipulated by an operator on a draft device, such as a tractor, pulling the carriage. The position of the crank axles when the carriage is lowered is illustrated in Figure 3.

The powerlift mechanisms are constructed so that, when set into operation by movement of the controlling lever 13 with the crank axles in the position illustrated in Figure 2, the powerlifts will swing the crank axles to the position of Figure 3 where the powerlifts will be automatically stopped and locked in position. When the lever 13 is pushed downwardly from the position of Figure 3 the powerlift mechanisms will move the crank axles from the position of Figure 3 to that of Figure 2. These powerlift mechanisms are of a well-known type and need not be described in detail.

The crank axles are independently adjustable through the medium of levers 14 and 15 mounted forward so as to be easily manipulated by an operator on the seat of a tractor or other draft device pulling the carriage. By means of these levers the height of the sides of the carriage may be varied to adapt it to varying conditions of operation.

Various tool units may be connected to the carriage such as the moldboard plows 20 and 21 illustrated in Figures 2 and 3. These plows are carried by beams 22 and 23 which are adjustably and detachably clamped to a supporting bar 24 which in turn is adjustably and detachably clamped to the universal carriage. The plow beams, together with the supporting bar, constitute a tool unit which combines with the carriage to form a plow. It is also possible to detach the plows from the supporting bar 24 leaving that bar connected to the carriage. The bar is thus available to receive other tools for performing other kinds of work.

The hitch includes two bars 30 and 31 which converge forwardly where they are connected together and to a releasable hitch member 32. The hitch member is, in turn, connected to a clevis 33 by means of which the hitch is attached to a source of power such as a tractor. The bars 30 and 31 are pivoted in the downwardly extending ends 4 and 5 of the cross brace 3 of the carriage. Pivoted between the bars 30 and 31 is a link 34 extending through a slot 35 in a member 36 fixed to the cross bar 3. The bar 34 is preferably a round metal bar with its ends flattened. The end extending to the rear is provided with a series of holes 37 for the reception of a U-shaped stop member 38. This member is shown in detail in Figure 6. It is preferably formed from a round metal rod having a flattened portion 39 which serves as the base of the U and which is bent in a semi-circle to give a resilient spring action. The two arms of the U converge toward each other and the distance between the outer ends is smaller than the distance between any two of the holes in the end of the bar 34. In order to insert the stop through the holes it is necessary to spread the arms slightly. After they have once been started, however, any jarring of the machine will tend to cause the stop member to move inward to its proper position and will prevent it from jarring out. In other words, the resilient action of the base of the U biases the two arms of the U toward each other, thereby preventing the stop from being jarred out of position and also tending to cause it to move inwardly should it not be forced to its innermost position when inserted in the holes.

When this hitch is used with a plow, as illustrated in Figures 2 and 3, the stop 38 is placed in the position shown in Figure 2, that is, it is inserted through two of the holes to the rear of the member 36. When the plow is in lowered position, the arms 30 and 31 are free to pivot on their connection to the draft bars 4 and 5 because the stop 38 is not in contact with the member 36 and the link 34 is free to slide back and forth in the slot 35 in member 36. This leaves the hitch free to adjust itself to the line of draft and it constitutes, in this position, a flexible hitch.

When the crank axles are swung to raise the plow from the position of Figure 2 there is an upward pressure on the draft bars 1 and 2 at the point where the crank axles are pivoted to the bars. The weight of the plow bodies and the fact that they are in the ground causes the center of resistance to be to the rear of the axes of the pivots of the crank axles to the bars 1 and 2. The result is that the front end of the plow tends to move upwardly and, if it were not stopped, the lifting action of the crank axles would simply tilt the front ends of the bars 1 and 2 upwardly and would not lift the plows sufficiently high above the ground. However, the upward movement of the forward ends of the draft bars is limited because, as these bars move upward, the link 34 slides forward in the slot in the member 36 until the stop 38 strikes the member 36, whereupon any further forward movement of link 34 is prevented. The hitch then becomes a rigid brace which prevents further upward movement of the forward end of the plow because the hitch itself is connected to a heavy draft device such as a tractor or a horse-drawn cart. When movement of the front end of the plow is stopped, the action of the lifting mechanism is to throw the rear end of the plow upwardly to lift the plow bodies out of the ground. The final result is that the plow is lifted to the position shown in Figure 3, in which position the hitch forms a rigid brace which holds the front end of the plow from moving upwardly. The front end of the plow may be moved downwardly if desired because such movement causes the link 34 to move rearwardly in the slot in the member 36 and there is nothing to prevent this movement. This offers a distinct advantage in that the front end of the plow can be depressed to elevate the plow bodies and the plow can be locked in that position by simply changing the location of the stop 38. For example, if the front end of the plow is depressed the link 34 moves rearwardly and, if the stop 38 is then removed and placed in holes immediately to the rear of member 36, the plow will be held in the position to which it has been moved. This gives convenient access to the plow bodies to change shares, an operation which has to be performed frequently in plowing, particularly when plowing in sandy or rocky soil.

It will, therefore, be understood that when the hitch is used with moldboard plows it is what may be termed a semi-flexible hitch, that is, it is freely flexible when the plow is in operating position, but it becomes rigid in one direction when the plow is raised and it serves to brace the front end of the plow against upward movement.

When the hitch is used with an implement such as a disc harrow, the U-shaped stop member 38 is placed astride the member 36, as illustrated in Figure 4. This locks the link 34 against movement in either direction and makes the hitch absolutely rigid. The disc harrow is shown in operating position in Figure 4 and, in this position, the hitch is held in one position and is not free to move relative to the line of draft. The height of the hitch may be varied by removing the stop 38 and inserting it through different holes in the end of the link 34, but when it is again placed in position astride the member 36 the hitch becomes rigid. The advantage of this construction in a disc harrow is that the machine may be adjusted about the axis of the pivot of the crank axles to the machine, and it may be held in that position so as to utilize the draft to hold the discs into the ground to a greater or less extent. For example, in Figure 4 if the hitch were adjusted so as to throw the front end of the machine upwardly, the discs would be moved deeper into the ground and they would be held in that position by the rigid hitch. The effect of the adjustment would be to push the inner ends of the gangs, that is the ends which are farthest to the rear, into the ground farther than the outer ends. This is due to the fact that the inner ends are farther from the axis about which the machine is adjusted than are the outer ends. This has an advantage because the tendency for disc harrows, positioned as shown, is to throw upwardly at their inner ends.

When the disc harrow is raised from the position shown in Figure 4, the front end of the machine is held rigid by the rigid hitch and the entire lifting action tends to draw the rear end of the implement upwardly to lift the discs clear of the ground.

Figure 8:
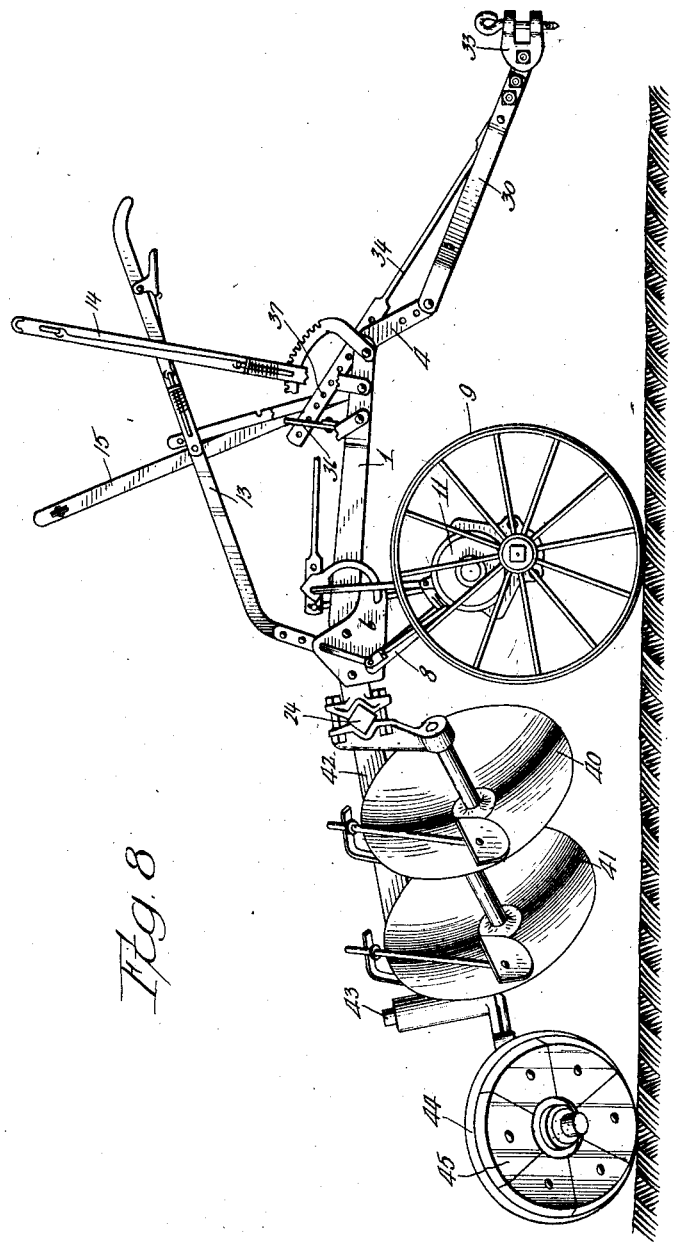
Figure 8 is a view similar to Figure 7, showing the disc plow in raised position.

When the hitch is used with an implement such as a disc plow shown in Figures 7 and 8, it should preferably be flexible at all times. The disc plow comprises discs 40 and 41 mounted on a V-shaped frame 42 clamped to the bar 24. Pivoted to the frame 42 is an axle 43 carrying a rear furrow wheel 44 having a plurality of heavy weights 45 connected to it. It is necessary to have a heavy weight associated with the disc plow in order to make it operate properly. This weight is such that it is not advisable to try to lift it clear of the ground. Instead, the implement is moved to the position illustrated in Figure 7 with much of the weight borne by the rear furrow wheel. This does not lift the plow discs as high above the ground as if they were lifted bodily with the rear furrow wheel, but it does lift them sufficiently high to clear obstructions, particularly in view of the fact that these discs are mounted to rotate and they will, therefore, roll over any obstructions which might accidentally be high enough to hit them.

When the hitch is used with a disc plow, the U-shaped stop 38 is removed entirely. This leaves the hitch absolutely flexible both in lowered and raised positions. When the disc plow is raised, the forward end of the bars 1 and 2 will be thrown upwardly to the position of Figure 8. Inasmuch as the stop 38 is no longer present there is nothing to stop the forward movement of the link 34 and the front ends of the bars will be moved upwardly until the crank axles have reached the limit of their movement. This tilts the front end of the implement upwardly to the position of Figure 8, leaving the rear end in an inclined position with a portion of the weight borne by the rear furrow wheel. In this position, the hitch is still flexible and free to adjust itself to the line of draft.

From the explanation given, it will be understood that a single construction has been devised which can be used either as a fully flexible, a semi-flexible, or as a rigid hitch. This is accomplished without any change in construction and by the simple adjustment of the position of the stop 37. When the hitch is used with a universal carriage, such as illustrated in the drawings, it facilitates the use of the carriage for a wide variety of purposes because the hitch can be easily adjusted to suit the particular requirements of the operation that is to be performed. The number of parts used is a minimum and these are of a very simple construction so that the total result is to greatly cheapen the cost of production of hitches of this type and at the same time, provide a hitch which can be used for a wider variety of purposes than any hitches heretofore devised.

It will be understood that the construction shown is for purposes of illustration, and that variations may be made in it without departing from the spirit and scope of the invention as defined by the claims.

I claim:

1. The combination with a tractor-drawn, agricultural implement provided with a draft structure and means for raising it so that the front end of the draft structure tends to tilt upwardly as it is raised, of hitch bars pivoted to the draft structure to swing up and down to adjust themselves to the line of draft, bracing means connected to the hitch bars near their forward ends and to the draft structure at a point in a different horizontal plane than the plane of the pivots of the hitch bars, one of said connections permitting movements of the hitch bars relative to the draft structure, and a holding means associated with one of the connections of the bracing means which may be readily adjusted to rigidly hold the bracing means to hold the hitch bars rigid relative to the draft structure, to limit their movement in either direction, or to leave them freely movable.

2. The combination with a tractor-drawn, agricultural implement provided with a draft structure and means for raising and lowering it so that the front end of the draft structure tilts upwardly as the draft structure is raised, of hitch bars pivoted to the draft structure to swing up and down to adjust themselves to the line of draft, a link pivoted to the hitch bars near their forward ends and movably connected to the draft structure at a point in a different horizontal plane than the plane of the pivots of the hitch bars, and means associated with the link and the draft structure which may be quickly adjusted to hold the link rigidly to the draft structure to hold the hitch bars firmly in position, or to limit the movement of the link to thereby permit the hitch bars to have a limited movement, or to leave the link freely movable to permit the hitch bars to move freely.

3. The combination with a tractor-drawn agricultural implement provided with a draft structure and means for raising and lowering it so that the front end of the draft structure tends to tilt upwardly as the draft structure is raised, of a pair of hitch bars pivoted to the draft structure to swing up and down to adjust themselves to the line of draft, said bars converging forwardly, a link pivoted between the forward ends of the bars and extending rearwardly and movably connected to the draft structure in a different horizontal plane than the plane of the pivots of the hitch bars, and a holding device associated with the rear end of the link and the draft structure by means of which the link may be quickly and easily locked rigidly, may be limited in movement in either direction, or may be left freely movable.

4. An implement hitch having hitch bars adapted to be pivoted to an implement, a link connected to the forward ends of the bars, the rear end of said link having a plurality of holes, a member having an opening through which the rear end of the link projects, and a stop member adapted to be inserted through the holes in the link and to contact the member through which the link projects, said stop member being constructed so that it may be inserted through holes in the link on opposite sides of the member to lock the link firmly to the member, may be inserted in holes on either side of the member to limit the movement of the link in either direction, or may be placed in holes at the extreme end of the link or removed entirely to leave the link free to move in the member.

5. An implement hitch having hitch bars whose rear ends are adapted to be pivoted to an implement, a link connected to the front ends of the hitch bars and extending rearwardly, the rear end of the link being provided with a plurality of holes, a member through which the rear end of the link projects, a U-shaped stop member adapted to be inserted in the holes in the link so that it can be located astride the member to lock the link to the member, or may be inserted in holes on either side of the member to limit the movement of the link in either direction, or may be quickly removed to permit the link to move freely relative to the member.

6. An implement hitch having draft members whose rear ends are adapted to be pivoted to an implement or the like, a link member pivoted to the forward ends of the draft members and extending rearwardly, a holding member relative to which the link is movable, and a stop member adapted to be quickly positioned on the link to lock the link to the holding member, or to limit the motion of the link relative to the holding member in either direction, or to leave the link free to move relative to the holding member.

7. An implement hitch having hitch bars whose rear ends of which are adapted to be pivoted to an implement or the like, a link pivoted to the forward ends of the bars and extending rearwardly, the rear ends of the link being provided with a series of holes, a holding member through which the rear end of the link projects, and a U-shaped stop member adapted to be inserted through the holes in the link, said U-shaped stop member having its arms converging toward one another so that, when inserted in the holes of the link, it will not jar out of place.

In testimony whereof, I affix my signature.

JOSEPH E. BODA.